United States Patent
Yuan et al.

(10) Patent No.: US 9,939,969 B2
(45) Date of Patent: Apr. 10, 2018

(54) SYSTEMS AND METHODS FOR CAPACITIVE TOUCH DETECTION

(71) Applicant: Marvell World Trade Ltd., St. Michael (BB)

(72) Inventors: Hangjian Yuan, Shanghai (CN); Hao Zhou, Shanghai (CN); Bike Xie, San Jose, CA (US); Kanke Gao, Fremont, CA (US); Xudong Shen, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 251 days.

(21) Appl. No.: 14/707,694

(22) Filed: May 8, 2015

(65) Prior Publication Data

US 2015/0324035 A1     Nov. 12, 2015

Related U.S. Application Data

(60) Provisional application No. 61/991,208, filed on May 9, 2014.

(51) Int. Cl.
*G06F 3/044*     (2006.01)
*G06F 3/041*     (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 8,874,396 | B1* | 10/2014 | Olson | G06F 3/044 345/173 |
| 8,982,097 | B1* | 3/2015 | Kuzo | G06F 3/0418 345/174 |
| 2006/0279548 | A1* | 12/2006 | Geaghan | G06F 3/0416 345/173 |
| 2008/0158172 | A1* | 7/2008 | Hotelling | G06F 1/3231 345/173 |
| 2008/0158182 | A1* | 7/2008 | Westerman | G06F 3/0416 345/173 |
| 2008/0246723 | A1* | 10/2008 | Baumbach | G06F 3/03547 345/156 |
| 2009/0009491 | A1* | 1/2009 | Grivna | G06F 3/033 345/184 |
| 2012/0043976 | A1* | 2/2012 | Bokma | H03K 17/955 324/679 |
| 2012/0092296 | A1* | 4/2012 | Yanase | G06F 3/0416 345/174 |
| 2012/0162129 | A1* | 6/2012 | Krah | G06F 1/3203 345/174 |

(Continued)

*Primary Examiner* — William Boddie
*Assistant Examiner* — Bipin Gyawali

(57) ABSTRACT

System and methods are provided for touch detection. An example system includes: a measurement unit configured to acquire capacitance measurement data from a touch panel; a pre-processing unit configured to detect whether a touch event occurs on the touch panel based at least in part on the capacitance measurement data and generate an activation signal in response to the detection of the touch event; and a microcontroller unit configured to be activated in response to the activation signal to perform post-processing operations related to the touch event.

19 Claims, 16 Drawing Sheets

(56) References Cited

U.S. PATENT DOCUMENTS

| | | | |
|---|---|---|---|
| 2013/0176272 A1* | 7/2013 | Cattivelli | G06F 3/041 345/174 |
| 2014/0021966 A1* | 1/2014 | Shahrokhi | G01R 27/2605 324/679 |
| 2014/0145997 A1* | 5/2014 | Tiruvuru | G06F 3/044 345/174 |

* cited by examiner

SYSTEMS AND METHODS FOR CAPACITIVE TOUCH DETECTION

CROSS-REFERENCE TO RELATED APPLICATIONS

This disclosure claims priority to and benefit from U.S. Provisional Patent Application No. 61/991,208, filed on May 9, 2014, the entirety of which is incorporated herein by reference.

FIELD

The technology described in this patent document relates generally to electronic circuits and more particularly to touch detection circuits.

BACKGROUND

Touch screens have been widely used as input interfaces for electronic devices for detecting touch inputs within a display area. A touch screen often includes a touch panel combined with a display screen. A touch panel usually has a construction based on a matrix of sensor nodes that form a two-dimensional array in a grid. For example, as shown in FIG. 1, a capacitive touch panel is often made of horizontal conductive lines (e.g., the horizontal conductive line 102) and vertical conductive lines (e.g., the vertical conductive line 104) which do not contact each other. Cross points of the horizontal conductive lines and the vertical conductive lines correspond to sensor nodes (e.g., the sensor node 106). When the touch panel is operated, an electric field is formed between two conductive lines at a sensor node. A finger touching the panel blocks some of the electric field, therefore reducing the capacitance at the sensor node. Each sensor node may be checked at each sampling interval to obtain capacitance measurement data which is processed to generate a detection signal. The detection signal is then compared against a predetermined threshold to determine whether the sensor node is touched. For an increasing number of applications, multiple simultaneous touches on a touch screen are to be detected. For example, it is often needed for a touch screen to detect gestures, such as a pinching motion between a thumb and a forefinger of a user.

Capacitive measurements for touch detection includes self capacitance sensing and mutual capacitance sensing. FIG. 2(A) and FIG. 2(B) depict example diagrams showing self capacitance sensing for a touch panel. Electrodes 1002 and 1004 are formed on an insulating material 1006, and correspond to one or more conductive lines (e.g., the conductive line 102, the conductive line 104). As shown in FIG. 2(A), the electrode 1004 is connected to ground, and a stimulus signal 1008 (e.g., $T_x$, an alternate-voltage signal) is applied on the electrode 1002. Without any touch event, a self capacitance associated with the touch panel is $C_S$. When a finger 1008 touches the touch panel as shown in FIG. 2(B), the capacitance between the finger 1008 and the Earth ground is $C_{Body}$, and the capacitance between a device ground (GND) of the touch panel and the Earth ground is $C_{Board}$. Both $C_{Body}$ and $C_{Board}$ are sufficiently large, and the finger 1008 can be considered as a virtual ground. The self capacitance associated with the touch panel changes to $(C_S+C_F)$, where $C_F$ represents a capacitance between the finger 1008 and the insulating material 1006.

FIG. 3(A) and FIG. 3(B) depict example diagrams showing mutual capacitance sensing for a touch panel. Electrodes 1102 and 1104 are formed on an insulating material 1106. A stimulus signal 1108 (e.g., $T_x$, an alternate-voltage signal) is applied on the electrode 1102, and a response signal 1110 (e.g., $R_x$) is received at the electrode 1104. Without any touch event, a mutual capacitance between the electrode 1102 and the electrode 1104 is $C_m$. When a finger 1118 touches the touch panel as shown in FIG. 3(B), the capacitance between the finger 1118 and the Earth ground is $C_{Body}$, and the capacitance between a device ground (GND) of the touch panel and the Earth ground is $C_{Board}$. Both $C_{Body}$ and $C_{Board}$ are sufficiently large, and the finger 1118 can be considered as a virtual ground. The mutual capacitance associated with the touch panel decreases in magnitude in response to the finger touch. Thus, a touch event on a touch panel can be identified by detecting the change of the self capacitance or the mutual capacitance associated with the touch panel.

SUMMARY

In accordance with the teachings described herein, system and methods are provided for touch detection. An example system includes: a measurement unit configured to acquire capacitance measurement data from a touch panel; a pre-processing unit configured to detect whether a touch event occurs on the touch panel based at least in part on the capacitance measurement data and generate an activation signal in response to the detection of the touch event; and a microcontroller unit configured to be activated in response to the activation signal to perform post-processing operations related to the touch event.

In one embodiment, a system for touch detection includes: a signal generator configured to generate one or more selection signals; a hybrid measurement component configured to acquire self capacitance data from a touch panel in response to the one or more selection signals corresponding to a first set of values and acquire mutual capacitance data from the touch panel in response to the one or more selection signals corresponding to a second set of values; and a signal processing component configured to determine whether a touch event occurs on the touch panel based at least in part on the self capacitance data or the mutual capacitance data.

In another embodiment, a method is provided for touch detection. Capacitance measurement data is acquired from a touch panel. Whether a touch event occurs on the touch panel is detected based at least in part on the capacitance measurement data. An activation signal is generated in response to the detection of the touch event. A microcontroller unit is activated in response to the activation signal to perform post-processing operations related to the touch event.

In yet another embodiment, a method is provided for touch detection. One or more selection signals are generated. Self capacitance data is acquired from a touch panel in response to the one or more selection signals corresponding to a first set of values. Mutual capacitance data is acquired from the touch panel in response to the one or more selection signals corresponding to a second set of values. Whether a touch event occurs on the touch panel is determined based at least in part on the self capacitance data or the mutual capacitance data.

DETAILED DESCRIPTION

A microcontroller unit (MCU) is often called upon to process capacitance measurement data of one or more sensor nodes on a touch panel once such measurement data is acquired, even though no touch event occurs on the touch panel. Thus, a significant portion of power consumption of the MCU may be expended on no-touch data processing.

Figure 1:
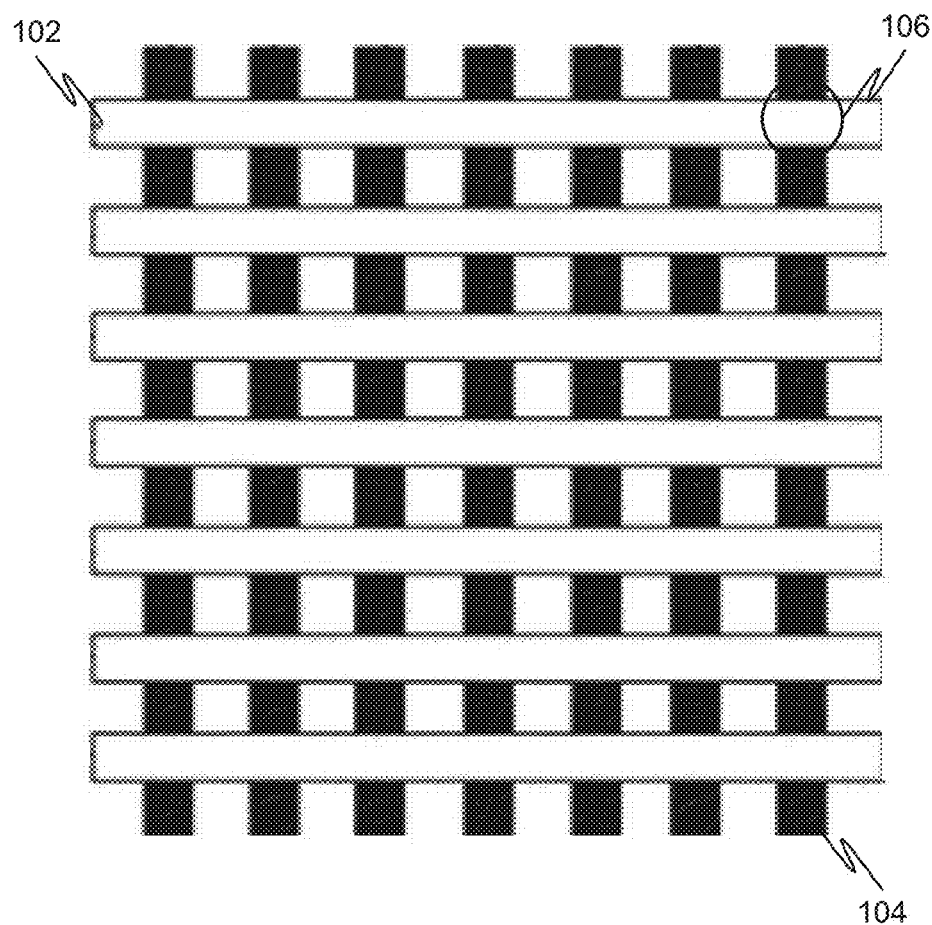
FIG. 1 depicts an example diagram of a touch panel.
Figure 2A:
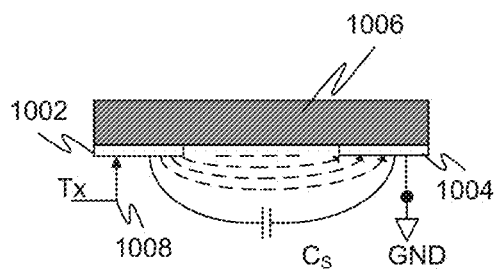
FIG. 2(A) and FIG. 2(B) depict example diagrams showing self capacitance sensing for a touch panel.
Figure 2B:
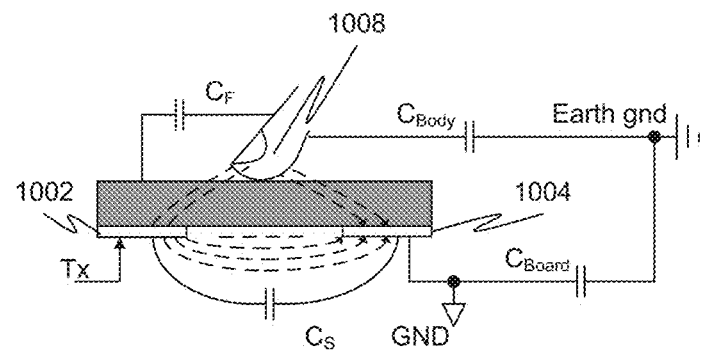
Figure 3A:
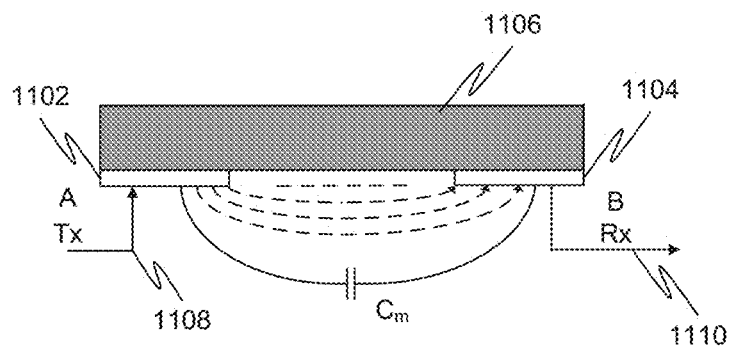
FIG. 3(A) and FIG. 3(B) depict example diagrams showing mutual capacitance sensing for a touch panel.
Figure 3B:
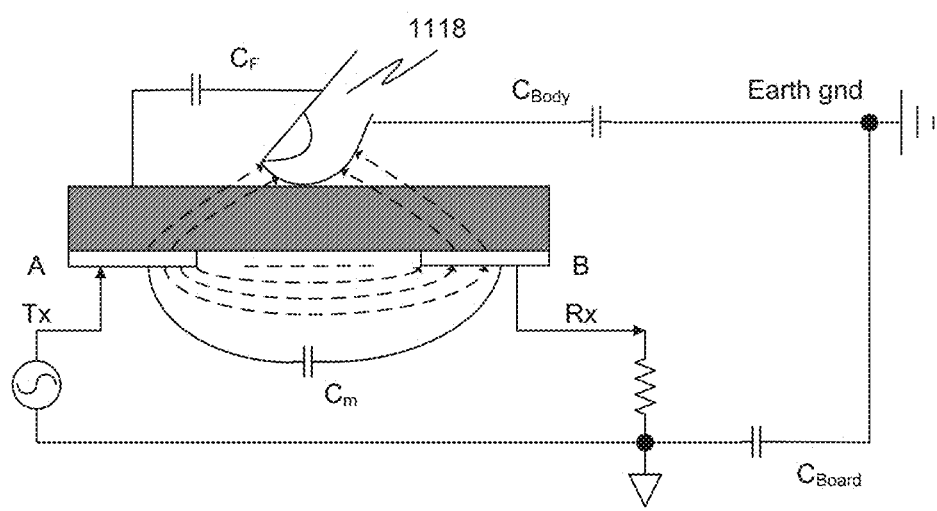
Figure 4:
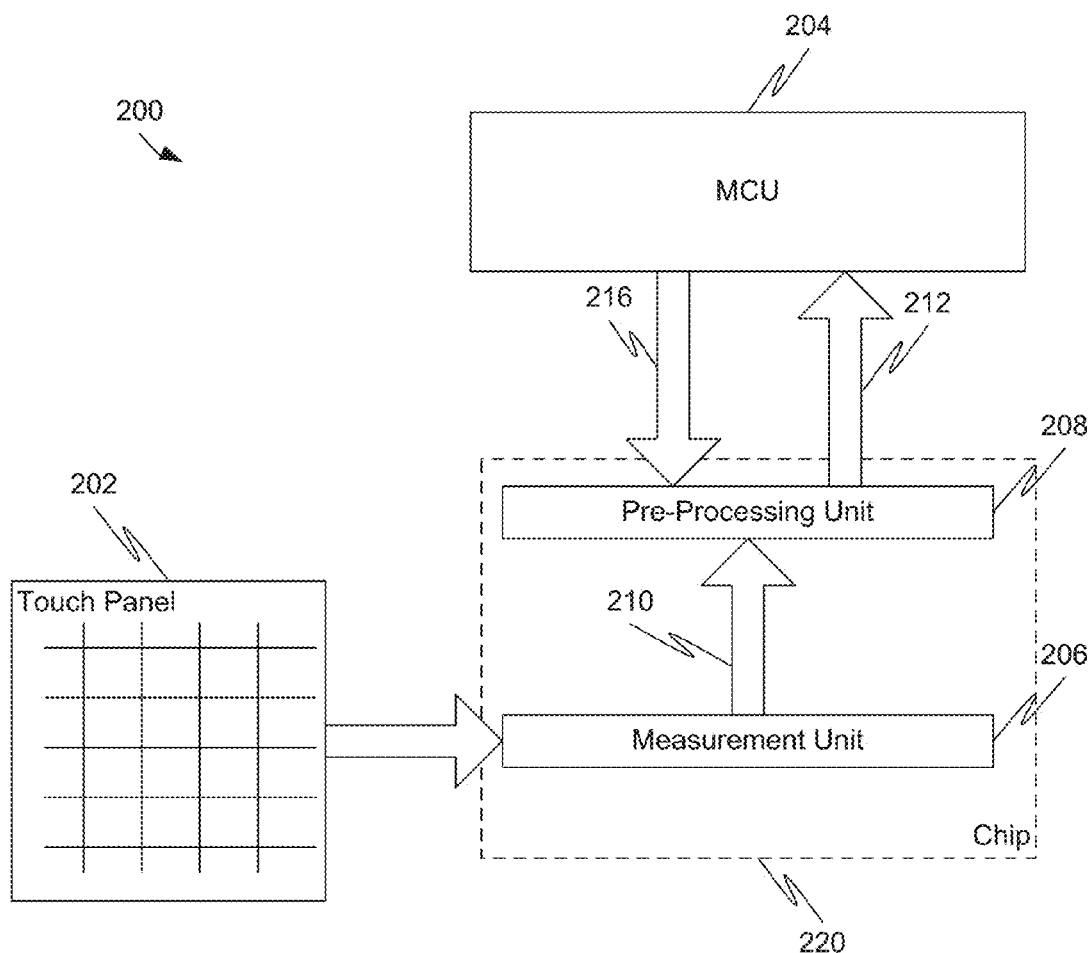
FIG. 4 depicts an example diagram of a system for touch detection.

FIG. 4 depicts an example diagram of a system for touch detection. As shown in FIG. 4, a pre-processing unit 208 detects whether a touch event occurs on a touch panel 202, and activates a MCU 204 for post-processing operations upon the detection of the touch event on the touch panel 202. Thus, the MCU 204 is not required for data processing when no touch event occurs on the touch panel 202 so as to reduce power consumption of the MCU 204.

Specifically, a measurement unit 206 acquires capacitance measurement data 210 from the touch panel 202. The pre-processing unit 208 processes the acquired capacitance measurement data 210 for touch detection and generates an activation signal 212 (e.g., an interrupt signal) to activate the MCU 204 when the capacitance measurement data 210 indicates that the touch panel 202 is touched. Once activated, the MCU 204 may perform a wide variety of post-processing operations, such as detection of a touch region, calculation of a number of touches, touch coordinate calculation, touch weight calculation, finger tracing, benchmark data error monitoring, water detection, charger noise detection, large object detection, etc. In some embodiments, the pre-processing unit 208 and the measurement unit 210 are included on a chip 220. The MCU 204 provides one or more control signals 216 to the pre-processing unit 208.

Figure 5:
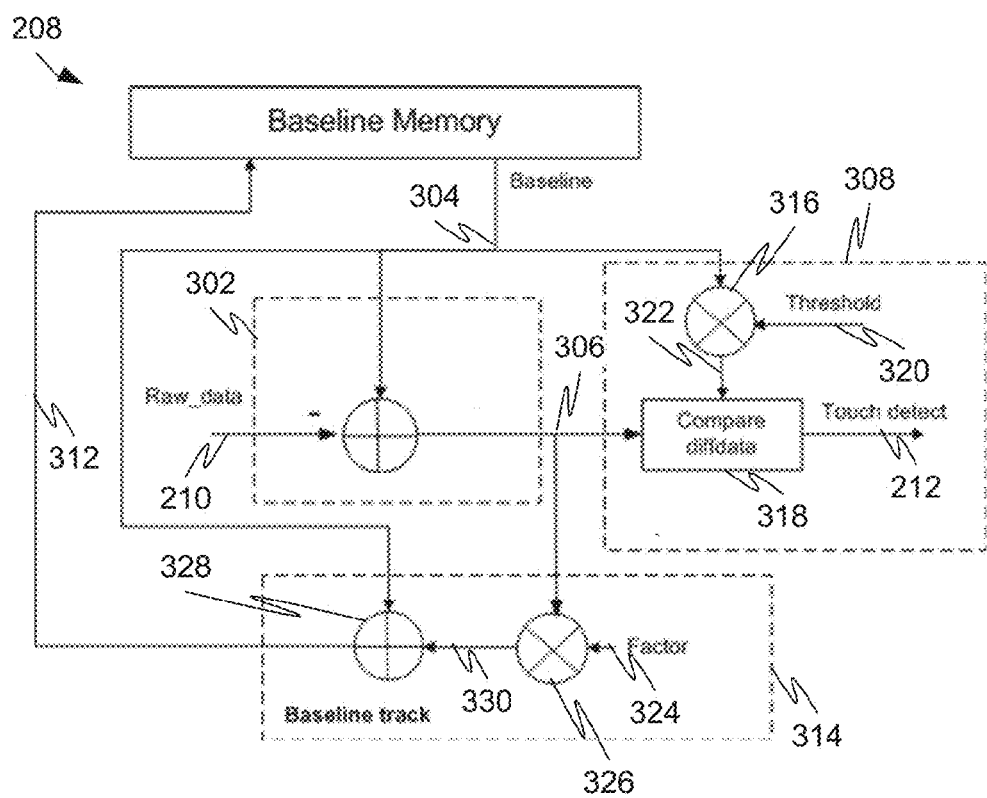
FIG. 5 depicts an example diagram of the pre-processing unit as shown in FIG. 4.

FIG. 5 depicts an example diagram of the pre-processing unit 208. As shown in FIG. 5, a raw-data processor 302 processes the capacitance measurement data 210 using a baseline signal 304 and generates a differential signal 306 that indicates a difference between the capacitance measurement data 210 and the baseline signal 304. A touch detector 308 determines whether a touch event occurs on the touch panel 202 and outputs the activation signal 212 upon the detection of the touch event.

Specifically, the touch detector 308 includes a multiplication component 316 and a comparator 318. The multiplication component 316 generates a threshold signal 322 based on a predetermined threshold 320 and the baseline signal 304. The comparator 318 compares the differential signal 306 and the threshold signal 322 to determine whether the difference between the capacitance measurement data 210 and the baseline signal 304 exceeds the predetermined threshold 320. If the difference between the capacitance measurement data 210 and the baseline signal 304 exceeds the predetermined threshold 320, it indicates that a touch event occurs on the touch panel 202, and the activation signal 212 is generated to activate the MCU 204. If the difference between the capacitance measurement data 210 and the baseline signal 304 does not exceed the predetermined threshold 320, the MCU 204 is not activated.

A baseline memory 310 updates the baseline signal 304 in response to a tracking signal 312 from a baseline-tracking unit 314. For example, a multiplication component 326 calculates an update value 330 by multiplying the differential signal 306 with a predetermined factor 324, and a summation component 328 calculates an updated baseline signal 312 based on the baseline signal 304 and the update value 330. In some embodiments, the baseline-tracking unit 314 is deactivated when a touch event on the touch panel 202 is detected or contamination (e.g., water) on the touch panel 202 is detected, so that the baseline signal is not updated and remains stable for a period of time.

Figure 6:
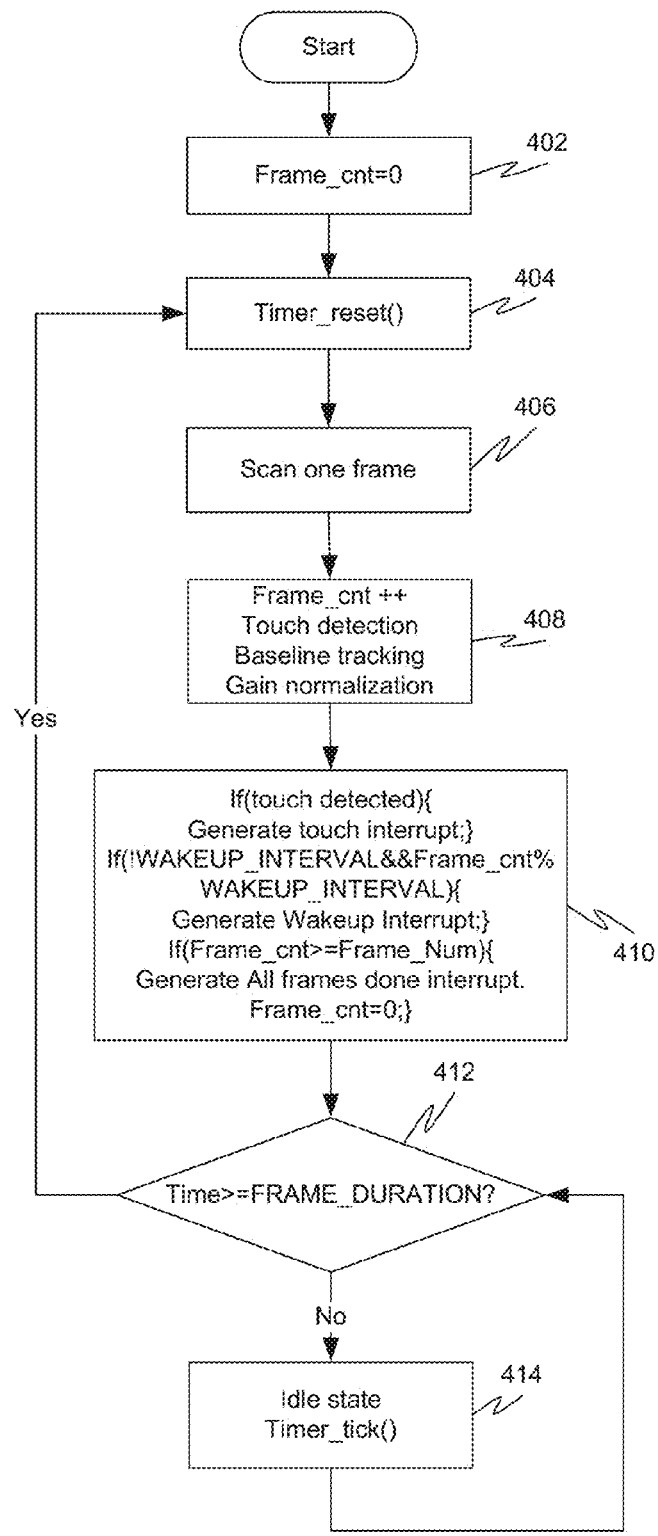
FIG. 6 depicts an example flow chart for the pre-processing unit as shown in FIG. 4.

FIG. 6 depicts an example flow chart for the pre-processing unit 208. Upon the start of the pre-processing unit 208, at 402, a number of frames (e.g., Frame_cnt) is set to 0, where each frame corresponds to one scan of the touch panel 202. At 404, a timer is reset (e.g., using a function timer_reset( )). At 406, a frame scan is performed on the touch panel 202 and capacitance measurement data is acquired. At 408, the number of frames increases by one, and the pre-processing unit 208 processes the acquired capacitance measurement data and determines whether a touch event occurs on the touch panel 202. In addition, the pre-processing unit 208 performs other tasks, such as baseline tracking and gain normalization. At 410, if a touch event is detected, the pre-processing unit 208 generates an activation signal (e.g., an interrupt) to activate the MCU 204. In some embodiments, the MCU 204 may be activated upon satisfaction of other conditions. For example, the MCU 204 may be activated after a predetermined time period (e.g., WAKE-UP_INTERVAL) so as to provide a next instruction to the pre-processing unit 208. If the number of frames that are processed reaches a maximum number (e.g., Frame_Num), an interrupt signal may generated to activate the MCU 204. At 412, it is determined whether the processing time reaches a threshold for the current frame (e.g., FRAME_DURATION). If the processing time does not reach the threshold for the current frame, at 414, the pre-processing unit 208 enters an idle state and waits until a next processing cycle arrives. If the processing time does reach the threshold for the current frame, the timer is reset (e.g., at 404), and another processing cycle starts.

Figure 7:
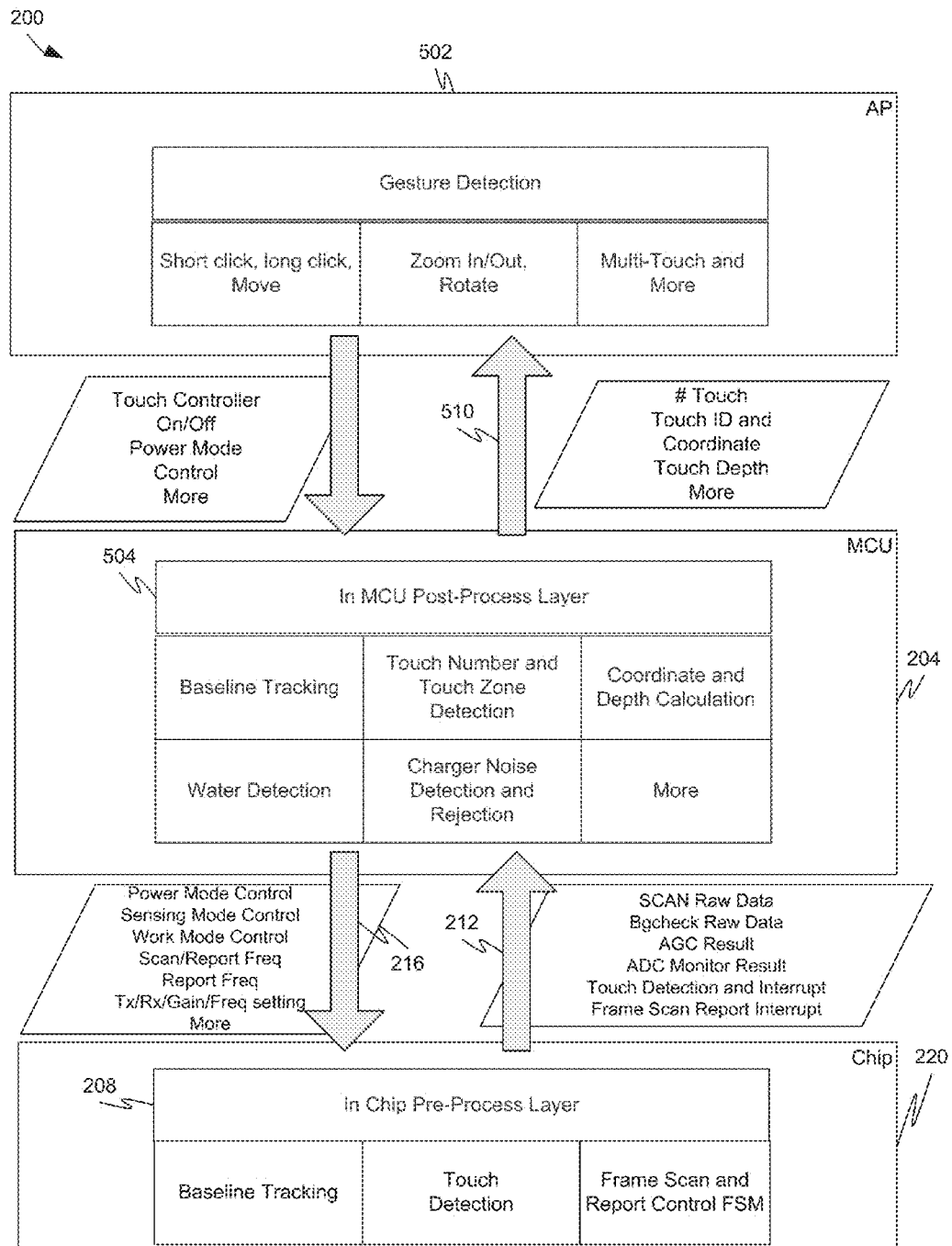
FIG. 7 depicts another example diagram of a system for touch detection.

FIG. 7 depicts another example diagram of a system for touch detection. As shown in FIG. 7, the pre-processing unit 208 included in the chip 220 performs pre-processing operations, such as touch detection (e.g., as shown in FIG. 4 and FIG. 5), frame scan and report control (e.g., as shown in FIG. 6), baseline tracking (e.g., as shown in FIG. 5), etc. The MCU 204 includes a post-processing layer 504 for performing post-processing operations, such as detection of a touch region, calculation of a number of touches, touch coordinate calculation, touch weight calculation, finger tracing, benchmark data error monitoring, water detection, charger noise detection, large object detection, etc. The system 200 further includes an application processing layer 502 for gesture detection. For example, the application processing layer 502 uses data 510 (e.g., including a touch number, touch coordinates, touch depth, etc.) provided by the MCU 204 to detect gestures, such as short click, long click, move, zoom in, zoom out, rotate, multi-touch events, etc.

Figure 8:
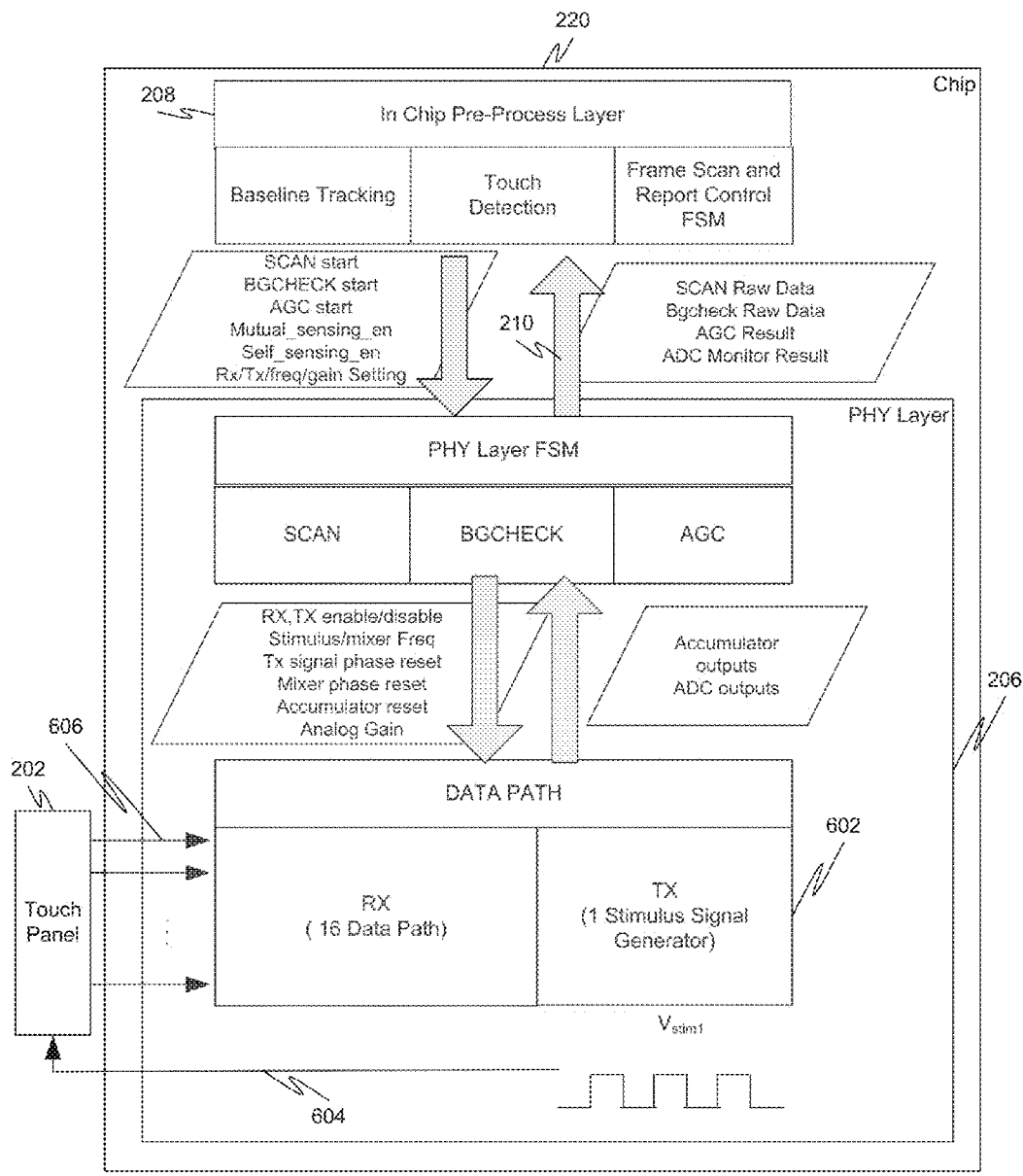
FIG. 8 depicts an example diagram for a chip as shown in FIG. 7.

FIG. 8 depicts an example diagram for the chip 220. As shown in FIG. 8, the measurement unit 206 (e.g., corresponding to a physical layer in the chip 220) includes a stimulus signal generator 602 which outputs a stimulus signal 604 to the touch panel 202. Response signals 606 associated with capacitance data of the touch panel 202 are received through one or more data paths (e.g., 16 data paths). Then, the measurement unit 206 (e.g., corresponding to the physical layer) performs various tasks. For example, the measurement unit 206 scans an entire frame of the touch panel 202 and reports the capacitance measurement data 210 to the pre-processing unit 208. In addition, the measurement unit 206 measures and reports a noise level for each frequency of the stimulus signal 604 to the pre-processing unit 208. Furthermore, the measurement unit 206 determines one or more analog gain settings for better utilizing an analog-to-digital converter and reports an optimal gain setting to the pre-processing unit 208.

Figure 9A:
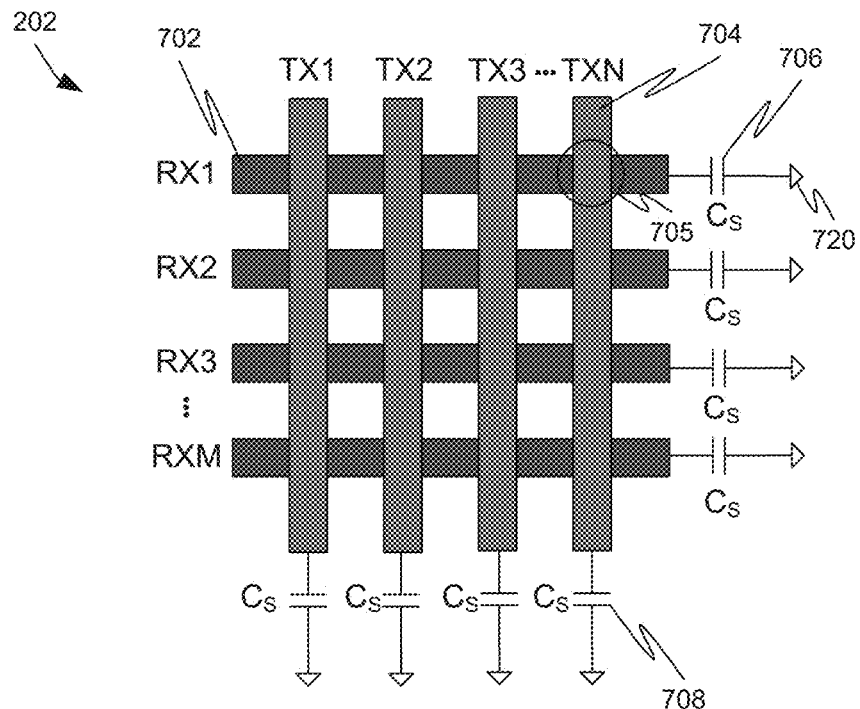
FIG. 9(A) depicts an example diagram showing self capacitance sensing for a touch panel.
Figure 9B:
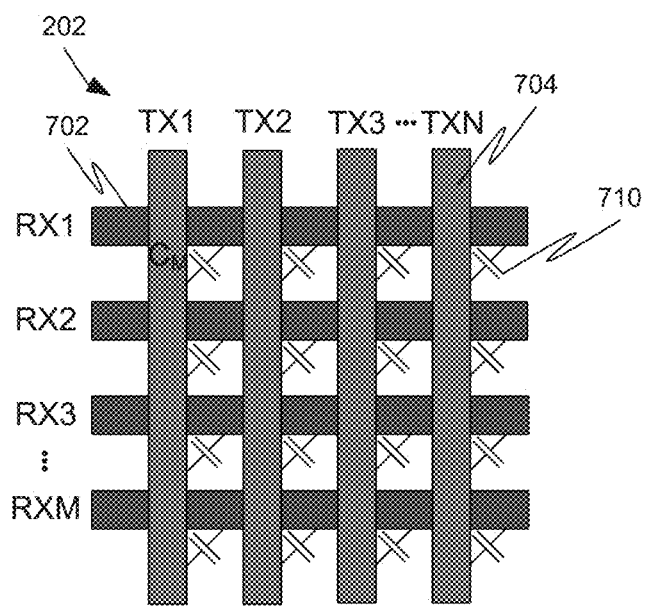
FIG. 9(B) depicts an example diagram showing mutual capacitance sensing for a touch panel.

The measurement unit 206 acquires the capacitance measurement data 210 through self capacitance sensing, mutual capacitance sensing, or a hybrid sensing method that combines self capacitance sensing and mutual capacitance sensing. FIG. 9(A) depicts an example diagram showing self capacitance sensing for the touch panel 202 and FIG. 9(B) depicts an example diagram showing mutual capacitance sensing for the touch panel 202. As shown in FIG. 9(A) and FIG. 9(B), the touch panel 202 includes horizontal conductive lines (e.g., the horizontal conductive line 702) and vertical conductive lines (e.g., the vertical conductive line 704) which do not contact each other. Cross points of the horizontal conductive lines and the vertical conductive lines correspond to sensor nodes (e.g., the sensor node 705). When the touch panel 202 is operated, an electric field is formed between two conductive lines at a sensor node.

As shown in FIG. 9(A), each conductive line has a self capacitance (e.g., $C_s$) against a device ground 720 of the touch panel 202. For example, the conductive line 702 has a self capacitance 706, and the conductive line 704 has a self capacitance 708. A scanning time for self capacitance sensing is related to a sum of the number of the horizontal conductive lines and the number of the vertical conductive lines. As shown in FIG. 9(B), each pair of a horizontal conductive line and a vertical conductive line has a mutual capacitance (e.g., $C_M$). For example, the conductive line 702 and the conductive line 704 have a mutual capacitance 710. A scanning time for mutual capacitance sensing is related to a product of the number of the horizontal conductive lines and the number of the vertical conductive lines. In some embodiments, the mutual capacitance sensing may provide real-time support for multi-touch detection. In certain embodiments, the self capacitance sensing may provide better accuracy for detecting floating touches and glove touches.

Figure 10:
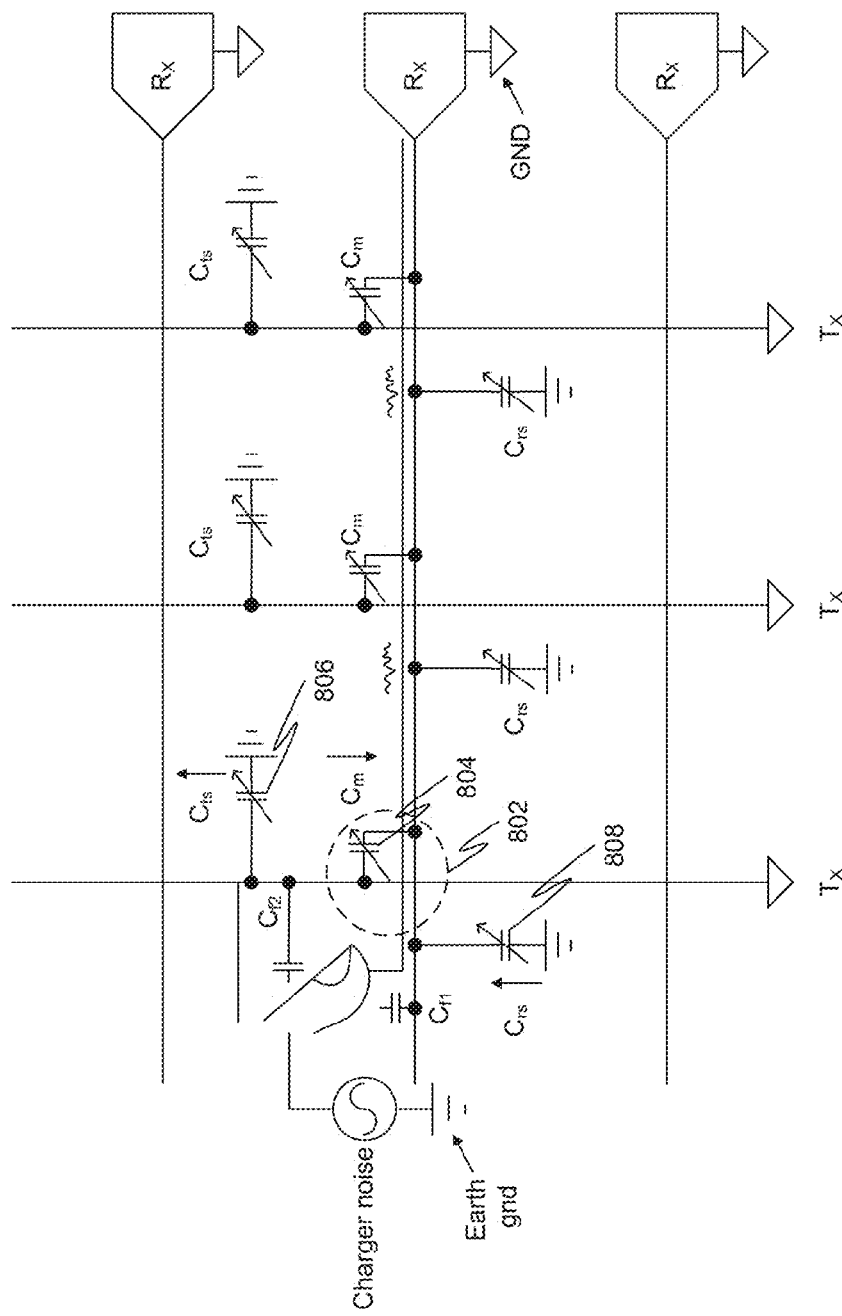
FIG. 10 depicts an example diagram showing self capacitance and mutual capacitance of a touch panel.

As shown in FIG. 10, when a finger touches the vicinity of a sensor node 802, a mutual capacitance 804 (e.g., $C_m$) between two conductive lines associated with the sensor node 802 decreases in magnitude, and both self capacitances 806 and 808 (e.g., $C_{ts}$, $C_{rs}$) of the two conductive lines decrease in magnitude as well. A hybrid sensing method that combines self capacitance sensing and mutual capacitance sensing can be implemented for touch detection.

Figure 11:
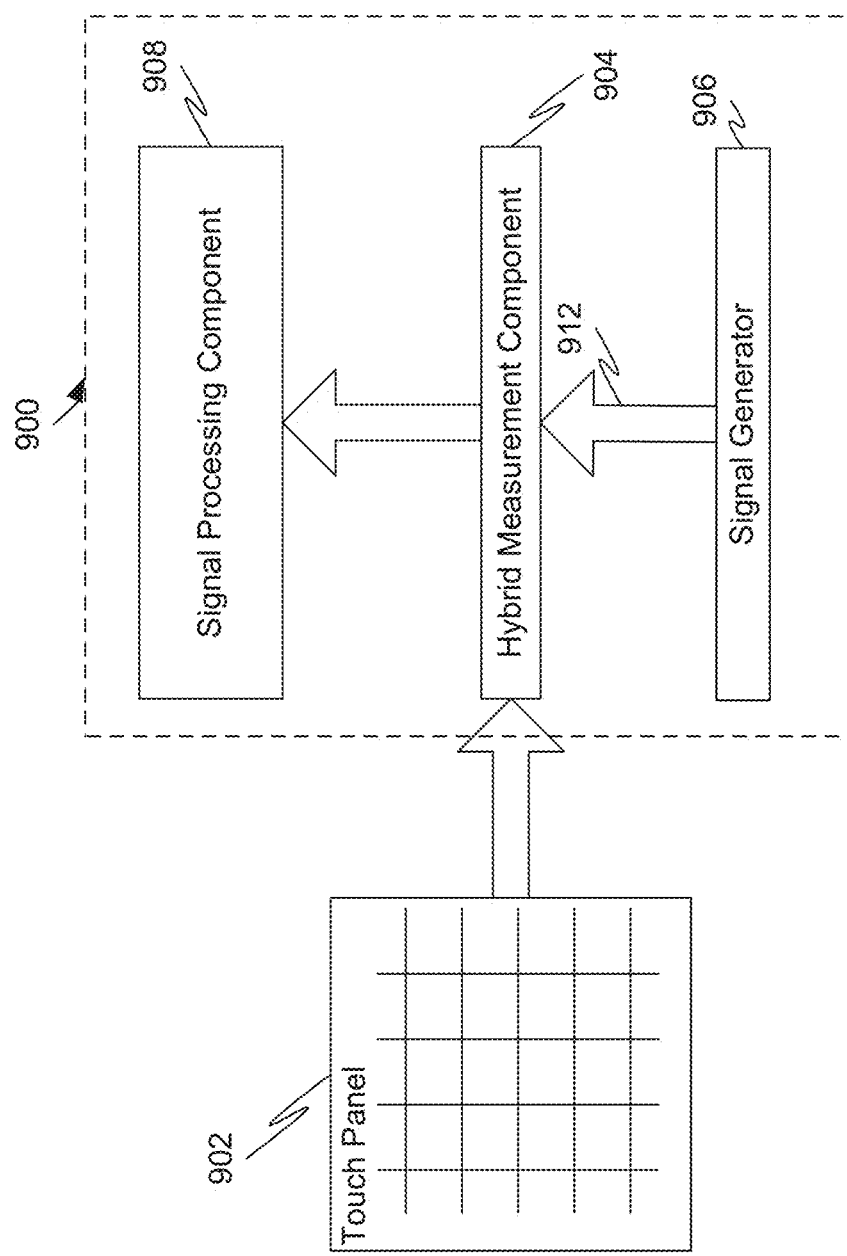
FIG. 11 depicts an example diagram showing a measurement unit implementing a hybrid sensing method.

FIG. 11 depicts an example diagram showing a measurement unit implementing a hybrid sensing method. As shown in FIG. 11, the measurement unit 900 includes a signal generator 906 which generates one or more selection signals 912. For example, the one or more selection signals 912 may be used to control one or more switches which are implemented to change the hardware configuration of a hybrid measurement component 904. In response to the one or more selection signals 912 corresponding to a first set of values, the hybrid measurement component 904 (e.g., in a first hardware configuration) acquires self capacitance data from a touch panel 902. In response to the one or more selection signals 912 corresponding to a second set of values, the hybrid measurement component 904 (e.g., in a second hardware configuration) acquires mutual capacitance data from the touch panel 902. Then, a signal processing component 908 determines whether a touch event occurs on the touch panel 902 based on the self capacitance data or the mutual capacitance data. As an example, the measurement unit 900 is the same as the measurement unit 208 as shown in FIG. 4.

Figure 12:
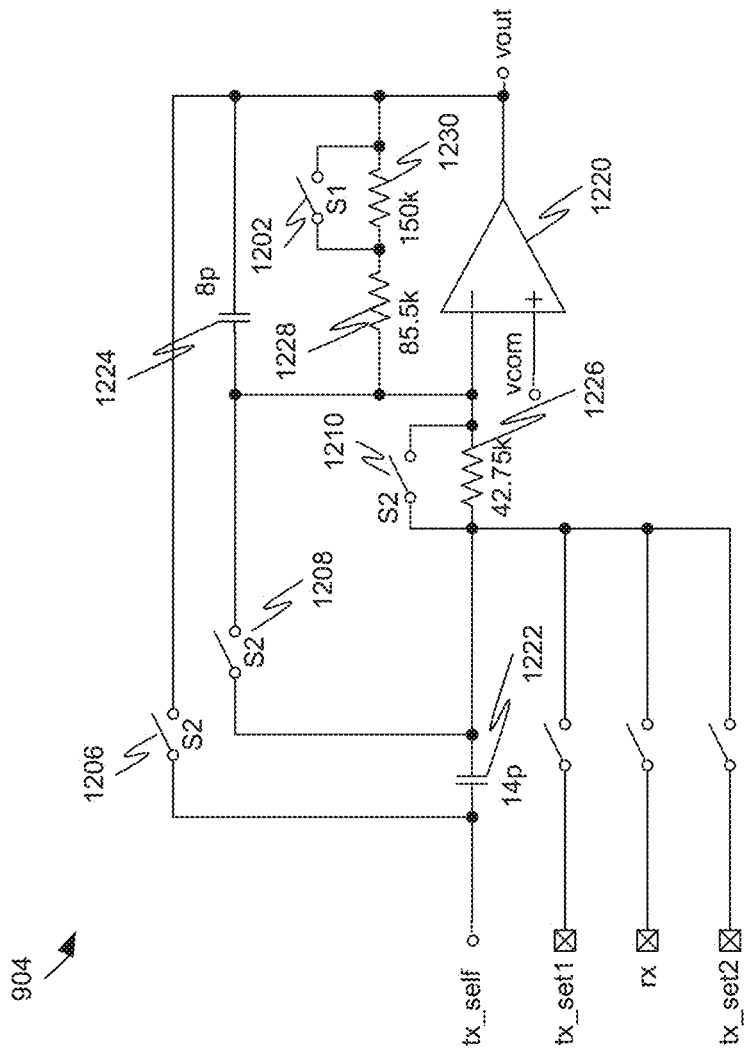
FIG. 12 depicts an example diagram of a hybrid measurement component.

FIG. 12 depicts an example diagram of a hybrid measurement component. As shown in FIG. 12, the hybrid measurement component 904 implements switches 1202, 1206, 1208 and 1210 to change the configuration of a number of hardware components (e.g., including a comparator 1220, capacitors 1222 and 1224, resistors 1226, 1228 and 1230, etc.) for performing self capacitance sensing or mutual capacitance sensing of the touch panel 902.

Figure 13A:
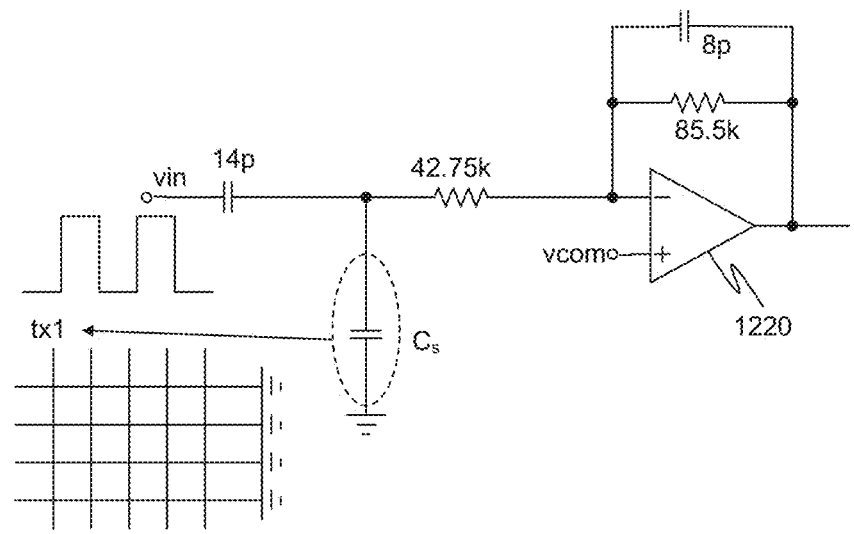
FIG. 13(A) depicts an example diagram showing a hardware configuration for self capacitance sensing.
Figure 13B:
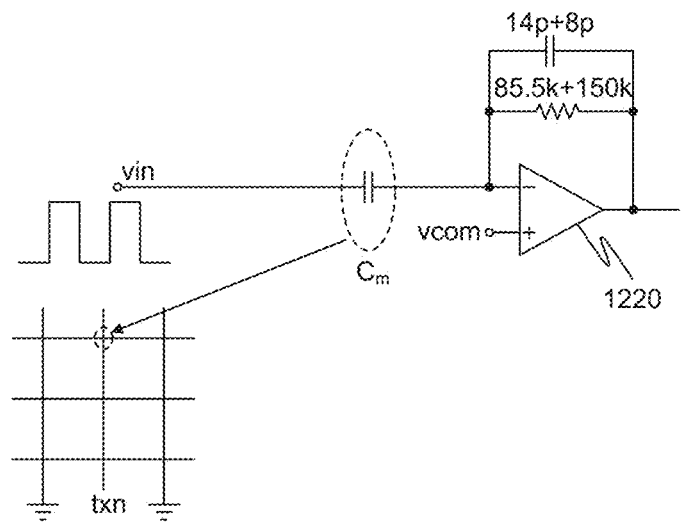
FIG. 13(B) depicts an example diagram showing a hardware configuration for mutual capacitance sensing.

Specifically, when the above-noted one or more selection signals 912 correspond to the first set of values, the switch 1202 is closed, and the switches 1206, 1208 and 1210 are open. Then, the hardware configuration of the hybrid measurement component 904 is equivalent to a configuration for self capacitance sensing as shown in FIG. 13(A). When the one or more selection signals 912 correspond to the second set of values, the switch 1202 is open, and the switches 1206, 1208 and 1210 are closed. The hardware configuration of the hybrid measurement component 904 is equivalent to a configuration for mutual capacitance sensing as shown in FIG. 13(B).

Figure 14:
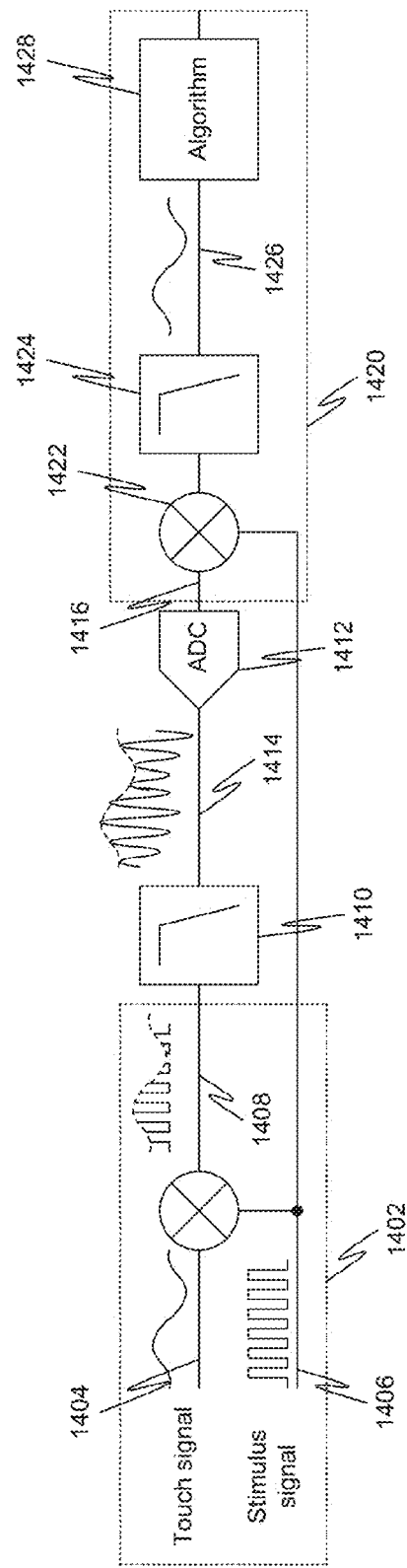
FIG. 14 depicts an example diagram for touch detection.

FIG. 14 depicts an example diagram for touch detection. As shown in FIG. 14, a modulator 1402 is implemented for modulating a touch signal 1404 to a stimulus signal 1406 to generate a modulation signal 1408. Specifically, the touch signal 1404 is converted from self capacitance measurement data or mutual capacitance measurement data of a touch panel, and is combined with the stimulus signal 1406 to generate the modulation signal 1408. For example, the modulator 1402 includes the measurement unit 900 as shown in FIG. 11.

A filter unit 1410 amplifies and filters the modulation signal 1408 generated by the modulator 1402. An analog-to-digital converter 1412 converts the conditioned signal 1414 to a digital signal 1416. A multiplication component 1422 and a low pass filter 1424 included in a processing component 1420 demodulate and filter the digital signal 1416 and generate a filtered signal 1426. A signal processing module 1428 performs further signal processing to support both self capacitance sensing and mutual capacitance sensing. In some embodiments, the low pass filter 1424 includes one or more large-order FIR filters. In certain embodiments, the large-order FIR filters are replaced with weighted sum operations to save power and circuit costs.

Figure 15:
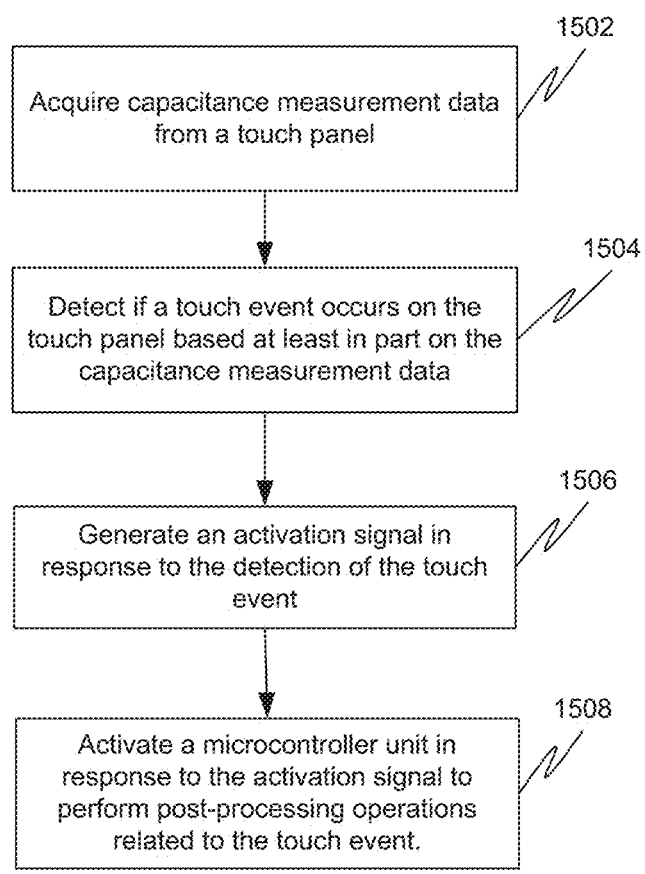
FIG. 15 depicts an example flow chart for touch detection.

FIG. 15 depicts an example flow chart for touch detection. At 1502, capacitance measurement data is acquired from a touch panel. At 1504, whether a touch event occurs on the touch panel is detected based at least in part on the capacitance measurement data. At 1506, an activation signal is generated in response to the detection of the touch event. At 1508, a microcontroller unit is activated in response to the activation signal to perform post-processing operations related to the touch event.

Figure 16:
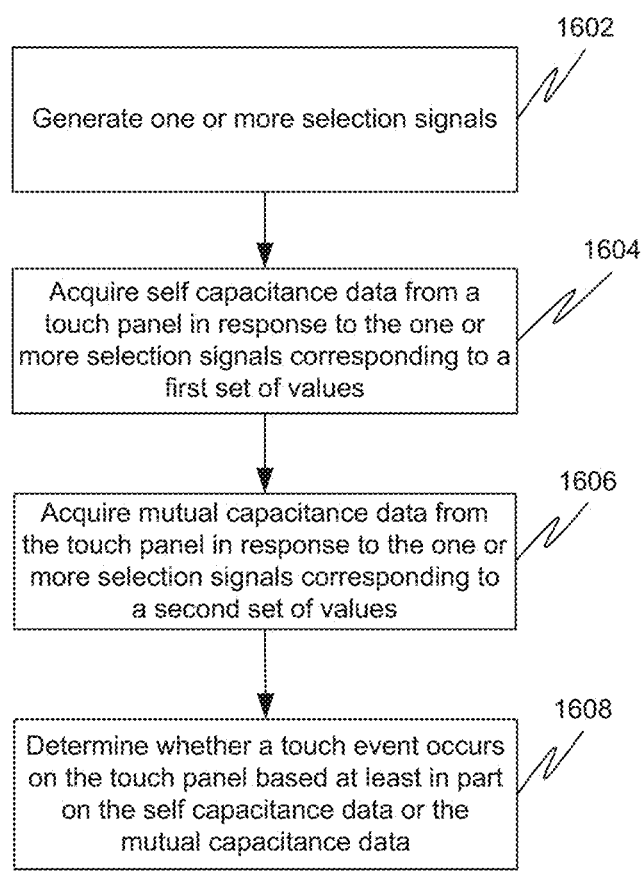
FIG. 16 depicts another example flow chart for touch detection.

FIG. 16 depicts another example flow chart for touch detection. At 1602, one or more selection signals are generated. At 1604, self capacitance data is acquired from a touch panel in response to the one or more selection signals corresponding to a first set of values. At 1606, mutual capacitance data is acquired from the touch panel in response to the one or more selection signals corresponding to a second set of values. At 1608, whether a touch event occurs on the touch panel is determined based at least in part on the self capacitance data or the mutual capacitance data.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein. Further, spatially relative terms, such as "horizontal," "vertical," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures.

What is claimed is:

1. A system for touch detection, the system comprising:
   a measurement unit configured to acquire capacitance measurement data from a touch panel;
   a pre-processing unit configured to detect whether a touch event occurs on the touch panel based at least in part on the capacitance measurement data and generate an interrupt signal to a microcontroller unit in response to the detection of the touch event; and
   the microcontroller unit configured (i) to be in a reduced-power state prior to receiving the interrupt signal and (ii) to be activated by the interrupt signal to exit the reduced-power state in order to perform post-processing operations related to the touch event;
   wherein detecting of whether the touch event occurs includes:
      adjusting a baseline value B by an amount (C−B)*F, wherein C represents a capacitance measurement, and F is a predetermined factor,
      generating a threshold signal value T as equal to B times a predetermined value,
      generating a difference D as equal to C−B, and
      determining whether a touch event has occurred based on a comparison between D and T;
   wherein the measurement unit is further configured to:
      acquire self capacitance measurement data from the touch panel by switching to a configuration in which a first capacitor and a first resistor are connected in parallel from an inverting input of an amplifier to an output of the amplifier, and a second resistor is connected from a second capacitor to the inverting input, and
      acquire mutual capacitance by switching to a configuration in which the first capacitor and the second capacitor and a third resistor are connected in parallel from the inverting input to the output.

2. The system of claim 1, wherein the pre-processing unit includes:
   a raw-data processor configured to generate a differential signal based at least in part on the capacitance measurement data and a baseline signal; and
   a touch detector configured to determine whether the touch event occurs on the touch panel based at least in part on the differential signal.

3. The system of claim 2, wherein the pre-processing unit further includes:
   a baseline-tracking unit configured to update the baseline signal based at least in part on the differential signal.

4. The system of claim 3, wherein the baseline-tracking unit is configured to be deactivated in response to the touch event being detected.

5. The system of claim 2, wherein the touch detector includes:
   a multiplication component configured to generate a threshold signal based at least in part on a predetermined threshold and the baseline signal; and
   a comparator configured to compare the differential signal and the threshold signal to determine whether the touch event occurs on the touch panel.

6. The system of claim 5, wherein the comparator is further configured to generate the interrupt signal in response to the differential signal being larger in magnitude than the threshold signal.

7. The system of claim 2, further comprising:
   a baseline memory configured to store data related to the baseline signal.

8. The system of claim 1, wherein the measurement unit is further configured to output a stimulus signal to the touch panel and receive a response signal associated with the capacitance measurement data from the touch panel.

9. The system of claim 1, wherein the post-processing operations include detection of a touch region, calculation of a number of touches, touch coordinate calculation, touch weight calculation, finger tracing, benchmark data error monitoring, water detection, charger noise detection, or large object detection.

10. The system of claim 1, wherein the measurement unit is configured to change a hardware configuration for acquiring the capacitance measurement data.

11. The system of claim 1, wherein the measurement unit is further configured to acquire mutual capacitance measurement data from the touch panel.

12. A system for touch detection, the system comprising:
a signal generator configured to generate one or more selection signals;
a hybrid measurement component configured to
    acquire self capacitance data from a touch panel in response to the one or more selection signals corresponding to a first set of values by switching to a first configuration in which a first capacitor and a first resistor are connected in parallel from an inverting input of an amplifier to an output of the amplifier, and a second resistor is connected from a second capacitor to the inverting input, and
    acquire mutual capacitance data from the touch panel in response to the one or more selection signals corresponding to a second set of values by switching to a second configuration in which the first capacitor and the second capacitor and a third resistor are connected in parallel from the inverting input to the output; and
a signal processing component configured to determine whether a touch event occurs on the touch panel based at least in part on the self capacitance data or the mutual capacitance data.

13. The system of claim 12, wherein the hybrid measurement component is further configured to change between the first configuration and the second configuration using one or more switches, the one or more switches being closed or opened in response to the one or more selection signals.

14. The system of claim 12, further comprising:
a pre-processing unit configured to generate an activation signal in response to the detection of the touch event; and
a microcontroller unit configured to be activated in response to the activation signal to perform post-processing operations related to the touch event.

15. A method for touch detection, the method comprising:
acquiring capacitance measurement data from a touch panel;
detecting whether a touch event occurs on the touch panel based at least in part on:
adjusting a baseline value B by an amount $(C-B)*F$, wherein C represents a capacitance measurement, and F is a predetermined factor,
generating a threshold signal value T as equal to B times a predetermined value,
generating a difference D as equal to $C-B$, and
determining whether a touch event has occurred based on a comparison between D and T;
generating an interrupt signal to a microcontroller unit in response to the detection of the touch event; and
wherein the microcontroller unit (i) is in a reduced-power state prior to receiving the interrupt signal and (ii) is activated by the interrupt signal to exit the reduced-power state in order to perform post-processing operations related to the touch event;
wherein a measurement unit is further configured to:
acquire self capacitance measurement data from the touch panel by switching to a configuration in which a first capacitor and a first resistor are connected in parallel from an inverting input of an amplifier to an output of the amplifier, and a second resistor is connected from a second capacitor to the inverting input, and
acquire mutual capacitance by switching to a configuration in which the first capacitor and the second capacitor and a third resistor are connected in parallel from the inverting input to the output.

16. A method for touch detection, the method comprising:
acquiring self capacitance data from a touch panel in response to one or more selection signals corresponding to a first set of values by switching to a first configuration in which a first capacitor and a first resistor are connected in parallel from an inverting input of an amplifier to an output of the amplifier, and a second resistor is connected from a second capacitor to the inverting input;
acquiring mutual capacitance data from the touch panel in response to one or more selection signals corresponding to a second set of values by switching to a second configuration in which the first capacitor and the second capacitor and a third resistor are connected in parallel from the inverting input to the output; and
determining whether a touch event occurs on the touch panel based at least in part on the self capacitance data or the mutual capacitance data.

17. The system of claim 1, wherein the third resistor comprises the first resistor coupled in series with another resistor.

18. The system of claim 12, wherein the third resistor comprises the first resistor coupled in series with another resistor.

19. The method of claim 16, wherein the third resistor comprises the first resistor coupled in series with another resistor.

* * * * *